(12) United States Patent
Chiang et al.

(10) Patent No.: US 11,474,658 B2
(45) Date of Patent: Oct. 18, 2022

(54) DISPLAYS CONTROLLED BASED ON MULTIPLE COMPUTING SYSTEMS BEING IDLE OR ACTIVE

(71) Applicant: Hewlett-Packard Development Company, L.P., Spring, TX (US)

(72) Inventors: Shang-Te Chiang, Taipei (TW); Chiu-Yun Hsu, Taipei (TW); Chen-Mu Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,877

(22) PCT Filed: Jul. 31, 2019

(86) PCT No.: PCT/US2019/044475
§ 371 (c)(1),
(2) Date: Jun. 28, 2021

(87) PCT Pub. No.: WO2021/021188
PCT Pub. Date: Feb. 4, 2021

(65) Prior Publication Data
US 2022/0147195 A1    May 12, 2022

(51) Int. Cl.
*G06F 3/0481* (2022.01)
*G06F 3/0484* (2022.01)
*G06F 3/147* (2006.01)

(52) U.S. Cl.
CPC .......... *G06F 3/0481* (2013.01); *G06F 3/0484* (2013.01); *G06F 3/147* (2013.01)

(58) Field of Classification Search
CPC .. G06F 3/0481; G06F 3/0484; G06F 3/04842; G06F 3/04886; G06F 3/1423; G06F 3/1431; G06F 3/1446; G06F 3/1454; G06F 3/147; G09G 5/12; G09G 5/14; G09G 2300/026; G09G 2370/20; G09G 2370/22
See application file for complete search history.

(56) References Cited

U.S. PATENT DOCUMENTS

| | | |
|---|---|---|
| 5,036,315 A | 7/1991 | Gurley |
| 7,058,891 B2 | 6/2006 | O'Neal et al. |
| 7,636,130 B2 | 12/2009 | Chang |
| 8,848,020 B2 * | 9/2014 | Abate ..................... H04N 7/15 709/204 |
| 9,864,400 B2 | 1/2018 | Evans et al. |

(Continued)

FOREIGN PATENT DOCUMENTS

CN     106843778     6/2017

OTHER PUBLICATIONS

"Monitors Anywhere Connect." Jul. 26, 2017 "Greenware Technologies.", 3 pages.

*Primary Examiner* — Vijay Shankar
(74) *Attorney, Agent, or Firm* — Fabian VanCott

(57) ABSTRACT

A display system may include a display panel and a processor. The processor is to cause the display panel to display data received from a first computing system and cause the display panel to display data received from one of the first computing system and a second computing system, in response to determining an idle state or an active state of the first computing system and the second computing system.

20 Claims, 10 Drawing Sheets

(56) References Cited

U.S. PATENT DOCUMENTS

| | | | |
|---|---|---|---|
| 10,372,403 B2* | 8/2019 | Marquardt | H04L 67/14 |
| 2007/0153132 A1 | 7/2007 | Jong | |
| 2012/0182381 A1* | 7/2012 | Abate | H04L 12/1822 |
| | | | 348/E7.083 |
| 2015/0029075 A1* | 1/2015 | Xiao | G06F 3/1454 |
| | | | 345/1.2 |
| 2016/0313965 A1* | 10/2016 | Chang | G06F 3/04883 |
| 2018/0074779 A1* | 3/2018 | Marquardt | H04L 67/38 |

* cited by examiner

DISPLAYS CONTROLLED BASED ON MULTIPLE COMPUTING SYSTEMS BEING IDLE OR ACTIVE

BACKGROUND

With the advent of technology, system environments having multiple computing systems are commonly utilized by users. A user, in such a system environment, may work on multiple computing systems simultaneously or sequentially, and accordingly may expect data or content from multiple computing systems to be displayed on a single display system, for example a display monitor.

BRIEF DESCRIPTION OF FIGURES

The detailed description is provided with reference to the accompanying figures, wherein.

DETAILED DESCRIPTION

Figure 1:
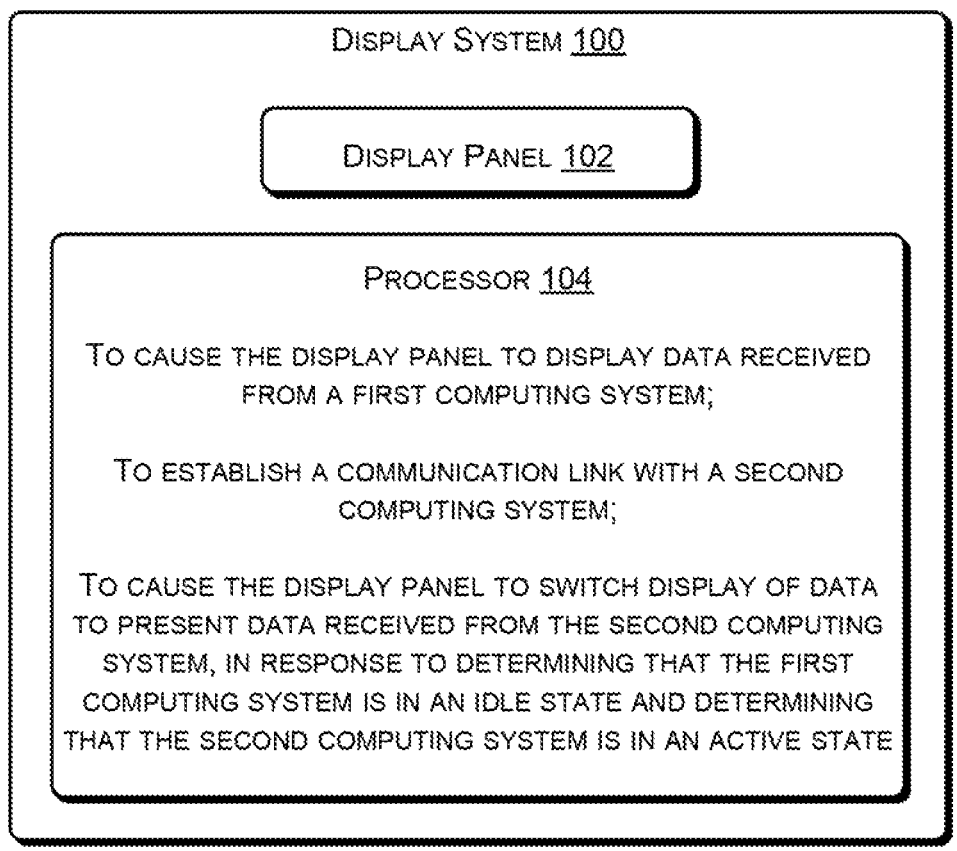
FIG. 1 illustrates a display system, according to an example.

A single display system, such as a display monitor, may be used by users working in a multi-computing systems-based environment. Although, each computing system in such an environment may have a display screen of their own, a user may choose to have data from multiple computing systems displayed on a single display system which, for example, may be relatively bigger in size in comparison to the display screen of each of the multiple computing systems or commonly visible to multiple users.

The display systems do not provide flexibility to the users to control or manage displays from multiple computing systems, depending on those on which the user is performing some activity, i.e., which are in an active state, and those on which the user has not performed any activity for a while, i.e., which are in an idle state. For example, one computing system is connected to a display system and the user has not performed any activity, such as pressing a keyboard key or operating a mouse, on the computing system for a while. The user now connects another computing system to the display system. The display system does not automatically display data received from the newly connected computing system, considering the previously connected computing system is in an idle state. The user may have to provide an input before the display system can switch the display to present the data from the newly connected computing system.

Further, in case two computing systems are connected to a single display system and the two computing systems are in active state, the display system displays data from one of the active computing systems as the main display and displays data from the other in the form of a picture-in-picture display. The picture-in-picture display is relatively smaller than the main display which may not serve the purpose for the user.

The user may, therefore, find controlling and managing of display of data from multiple computing systems connected to a single display system cumbersome. The control and management of display of data on a single display system becomes more complex in case data from more than two computing systems are to be displayed on the display system.

The present subject matter describes example display systems and example approaches of controlling and managing display of data from multiple computing systems on a single display system.

In an example, the display system may include a display panel on to which data is displayed or presented. The display panel may be a liquid crystal display (LCD) panel or alight emitting diode (LED) based display panel. Consider a case in which the display system is communicatively connected to a first computing system and a new communication link is established with a second computing system. The display system determines, in real-time, whether the first computing system and the second computing system are respectively in an active state or an idle state. A computing system may be in an active state, for example, when an activity is performed on the computing system during a predetermined time period. A computing system may be in an idle state, for example, when an activity is not performed on the computing system during a predetermined time period. The predetermined time period may be defined by a user. In an example, the predetermined time period may be 30 seconds. In an example, the activity may include a user activity, a host activity, or a combination thereof. The user activity may be an activity performed by a user and may include, but is not limited to, pressing a keyboard key of the computing system, operating a mouse connected to the computing system, and being present in front of a computing system to be detected for the presence in front of the computing system using a proximity sensor. The proximity sensor may include an image capturing device, such as a camera. The host activity may be a background activity associated with an application or computer-readable instructions which is being executed or performed at the background in the computing system. The host activity may include, but is not restricted to, a system operation, uploading or downloading a file or an application, installation of an application or computer-readable instructions, operation of an application, and execution of computer-readable instructions.

In response to determining that the first computing system is in an idle state and determining that the newly connected second computing system is in an active state, the display on the display panel is switched to display data received from the second computing system. Thus, the display of data on the display panel is switched automatically, i.e., without a user input, upon determining that the previously connected first computing system is in the idle state and the newly connected second computing system is in the active state.

Further, in an example, upon determining that the connected computing systems, i.e., the first computing system and the second computing system, are respectively in the active state, a prompt is provided on the display system to receive a user input based on which the data received from the first computing system and the second computing system may be displayed on the display panel. The user input may be received through a toggle-switch on the display system or through a gesture-based user interface provided on the display panel. In response to receiving the user input, the display of the data received from the first computing system is shrunk to a first portion of the display panel and the data received from the second computing system is displayed on a second portion of the display panel. The first portion and the second portion of the display panel are non-overlapping portions of the display panel.

The display systems and approaches of controlling and managing display of data from multiple computing systems on a single display system facilitate automatic and efficient display of data from computing systems which are active, for example.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a display system 100, according to an example. The display system 100 may be an output device or an electronic display, for example, a display monitor and a television. As shown, the display system 100 includes a display panel 102. In an example, the display panel 102 is an LCD-based display panel or an LED-based display panel.

Further, the display system 100 may include a memory (not shown in FIG. 1). The memory may include a non-transitory computer-readable medium including, for example, a volatile memory, such as a static random access memory (SRAM) and a dynamic random access memory (DRAM), or a non-volatile memory, such as a read-only memory (ROM), an erasable programmable ROM, a flash memory, a hard disk, an optical disk, a memristor, and a magnetic tape.

Further, the display system 100 includes a processor 104. The processor 104 is coupled to the display panel 102. In some examples, the disclosure described herein is implemented by executing instructions stored a memory by the processor 104. The processor 104 may be implemented as a microprocessor, a microcomputer, a microcontroller, a digital signal processor, a central processing unit, state machines, a logic circuitry, or any device that manipulates signals based on operational instructions. Among other capabilities, the processor 104 may fetch and execute computer-readable instructions stored in a non-transitory computer-readable storage medium, such as the memory. Further, the processor 104 may be provided through the use of dedicated hardware as well as hardware capable of executing computer-readable instructions.

In an example, the processor 104 causes the display panel 102 to display data received from a first computing system (not shown in FIG. 1). The first computing system, as described later with respect to the description of FIG. 2, may be a desktop computer, a laptop computer, a tablet computer, a server, or a similar computing machine communicatively connected with the display system 100. The first computing system may be communicatively connected with the display system 100 over a wired or a wireless link.

While the display panel 102 displays the data received from the first computing system, the processor 104 may establish a communication link with a second computing system (not shown in FIG. 1). The second computing system, as described later with respect to the description of FIG. 2, may be a desktop computer, a laptop computer, a tablet computer, a server, or a similar computing machine communicatively connected with the display system 100. The communication link may be a wired communication link or a wireless communication link.

After establishing the communication link with the second computing system, the processor 104 may determine whether the first computing system and the second computing system respectively are in an idle state or an active state. A computing system may be in an active state, for example, when an activity is performed on the computing system during a predetermined time period. A computing system may be in an idle state, for example, when an activity is not performed on the computing system during a predetermined time period. The predetermined time period may be defined by a user. In an example, the predetermined time period may be 30 seconds. In an example, the activity may include a user activity, a host activity, or a combination thereof. The user activity may be an activity performed by a user and may include, but is not limited to, pressing a keyboard key of the computing system, operating a mouse connected to the computing system, and being present in front of a computing system to be detected for the presence in front of the computing system using a proximity sensor. The proximity sensor may include an image capturing device, such as a camera. The host activity may be a background activity associated with an application or computer-readable instructions which is being executed or performed at the background in the computing system. The host activity may include, but is not restricted to, a system operation, uploading or downloading a file or an application, installation of an application or computer-readable instructions, operation of an application, and execution of computer-readable instructions. An example procedure of determining whether a computing system is in an idle state or an active state is described with reference to FIG. 2.

Further, in response to determining that the first computing system is in an idle state and determining that the second computing system is in an active state, the processor 104 causes the display panel 102 to switch display of data to present data received from the second computing system. Thus, the display system 100 stops displaying the data received from the previously connected idle first computing system and automatically switches the display to present the data received from the newly connected active second computing system. The further operation of the display systems described herein is described in detail with respect to FIG. 2.

Figure 2:
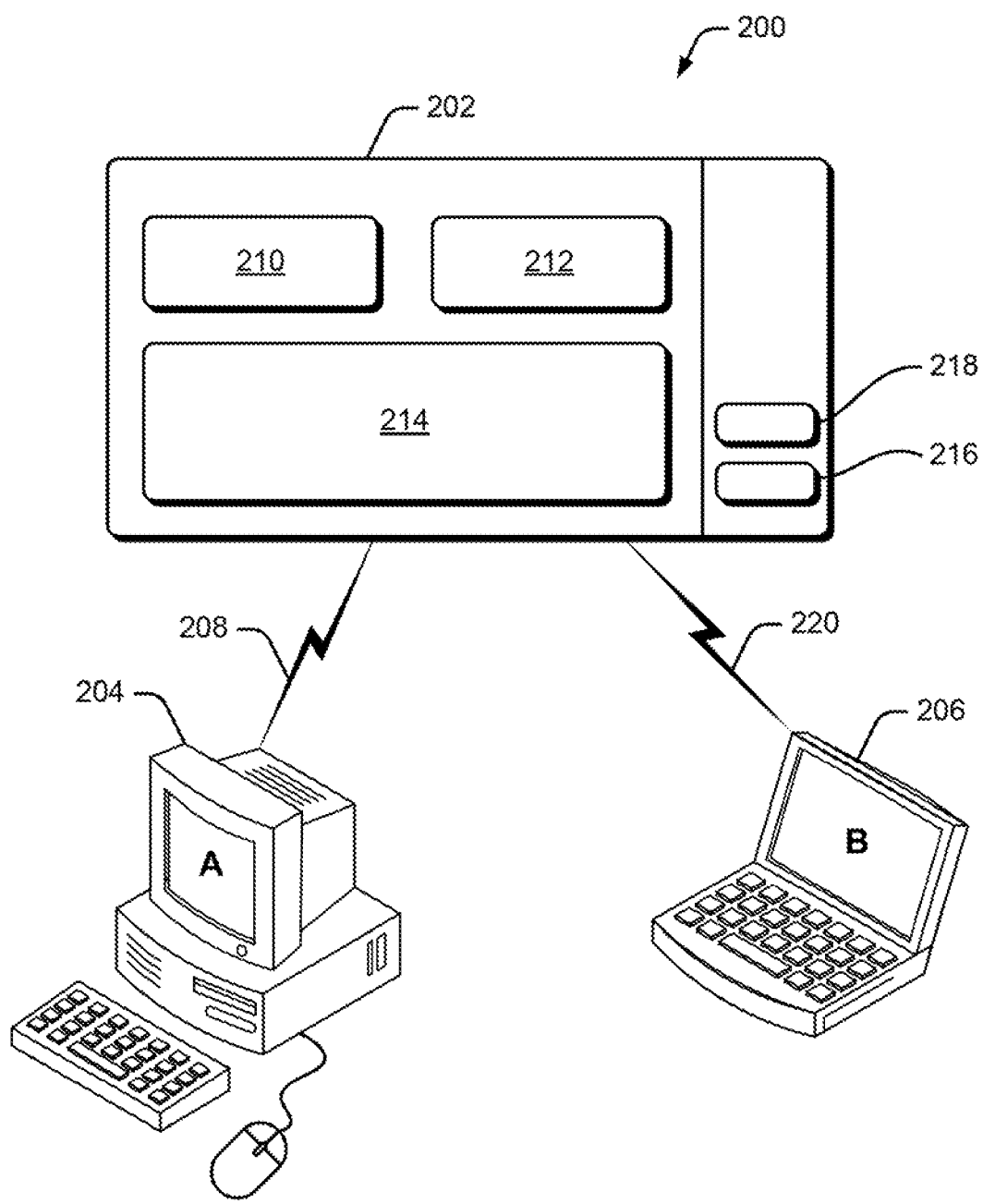
FIG. 2 illustrates a system environment with two computing systems and one display system, according to an example.

FIG. 2 illustrates a system environment 200 with two computing systems and one display system, according to an example. The system environment 200 includes a display system 202, a first computing system 204, and a second computing system 206. The display system 202 may be similar to the display system 100. The first computing system 204 may be a desktop computer, a laptop computer, a tablet computer, a server, or a similar computing machine, used by a user (not shown). The second computing system 206 may be a desktop computer, a laptop computer, a tablet computer, a server, or a similar computing machine, used by the same user using the first computing system 204 or a different user (not shown).

In an example, the first computing system 204 is communicatively connected to the display system 202 over a first communication link 208. The first communication link 208 may be a wired communication link or a wireless communication link. The display system 202 and the first computing system 204 may include at their respective ends an interface, including universal serial bus (USB) port(s), video graphics array (VGA) port(s), high-definition multimedia interface (HDMI) port(s), and such for establishing the wired communication link. Similarly, the display system 202 and the first computing system 204 may include at their respective ends an interface, including wireless transmitter and receiver port(s), for establishing the wireless communication link.

The display system 202 includes a processor 210, a memory 212, and a display panel 214. The processor 210, the memory 212, and the display panel 214 may be similar to the processor 104, the memory, and the display panel 102, respectively, as described with reference to FIG. 1.

Further, as shown in FIG. 2, the display system 202 includes a power-switch 216 and a toggle-switch 218. The power-switch 216 is actuatable by a user for the purpose of switching ON or switching OFF the display system 202. The toggle-switch 218 is actuatable by a user to provide a user input for controlling and managing display of data on the display system 202.

While the first computing system 204 is communicatively connected to the display system 202, the processor 210 receives a first message from the first computing system 204. The first message is indicative of one of an active state and an idle state of the first computing system 204 based on an activity being performed on the first computing system 204. The idle state and the active state of the first computing system 204 and the activity may be the same as described with respect to FIG. 1. The processor 210 may receive the first message periodically, for example, at an interval of 1 second. The processor 210 may decode the first message to determine whether the first computing system 204 is in the idle state or the active state.

In an example, the display system 202 may establish a second communication link 220 with the second computing system 206. The second communication link 220 may be a wired communication link or a wireless communication link. The second computing system 206 may include an interface, including USB port(s), VGA port(s), HDMI port(s), and such for establishing the wired communication link with display system 202. Similarly, the second computing system 206 may include an interface, including wireless transmitter and receiver port(s), for establishing the wireless communication link with the display system 202.

Upon establishing the second communication link 220 with the second computing system 206, the processor 210 receives a second message from the second computing system 206. The second message is indicative of one of an active state and an idle state of the second computing system 206 based on an activity being performed on the second computing system 206. The idle state and the active state of the second computing system 206 and the activity may be the same as described with respect to FIG. 1. The processor 210 may receive the second message periodically, for example, at an interval of 1 second. The processor 210 may decode the second message to determine whether the second computing system 206 is in the idle state or the active state.

Figure 3:
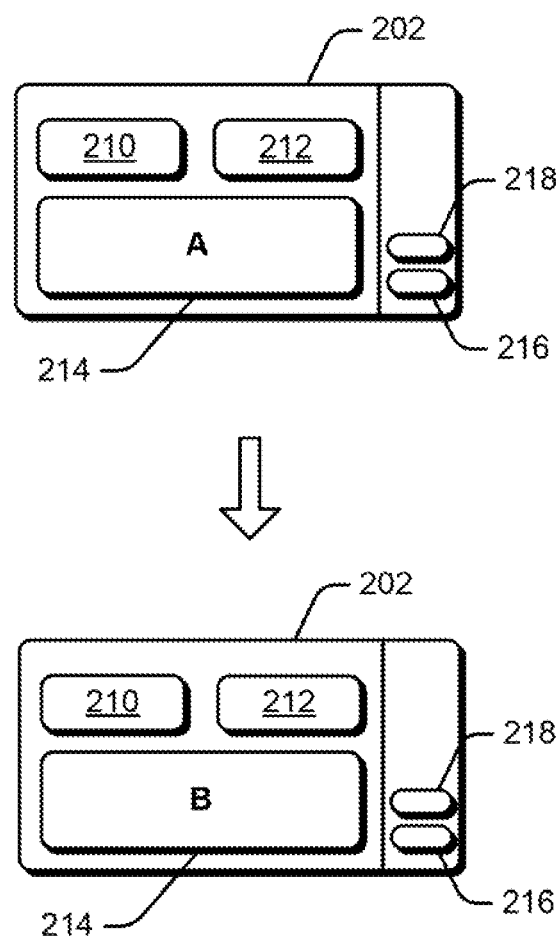
FIG. 3 illustrates the display system of FIG. 2 to switch display of data on the display system, according to an example.

Based on the first message and the second message, the processor 210 determines whether the previously first computing system 204 and the newly connected second computing system 206 respectively are in an idle state or an active state. In response to determining that the first computing system 204 is in an idle state and determining that the second computing system 206 is in an active state, the processor 210 causes the display panel 214 to switch display of data to present data received from the second computing system 206. FIG. 3 illustrates the display system 202 of FIG. 2 to switch display of data on the display system 202, according to an example. For example, the data received from the first computing system 204 for displaying on the display panel 214 is denoted by "A", and the data received from the second computing system 206 for displaying on the display panel 214 is denoted by "B". As shown in FIG. 3, the data displayed or presented on the display panel 214 is automatically switched from data A to data B when the first computing system 204 is determined to be in the idle state and the second computing system 206 is determined to be in the active state.

Figure 4:
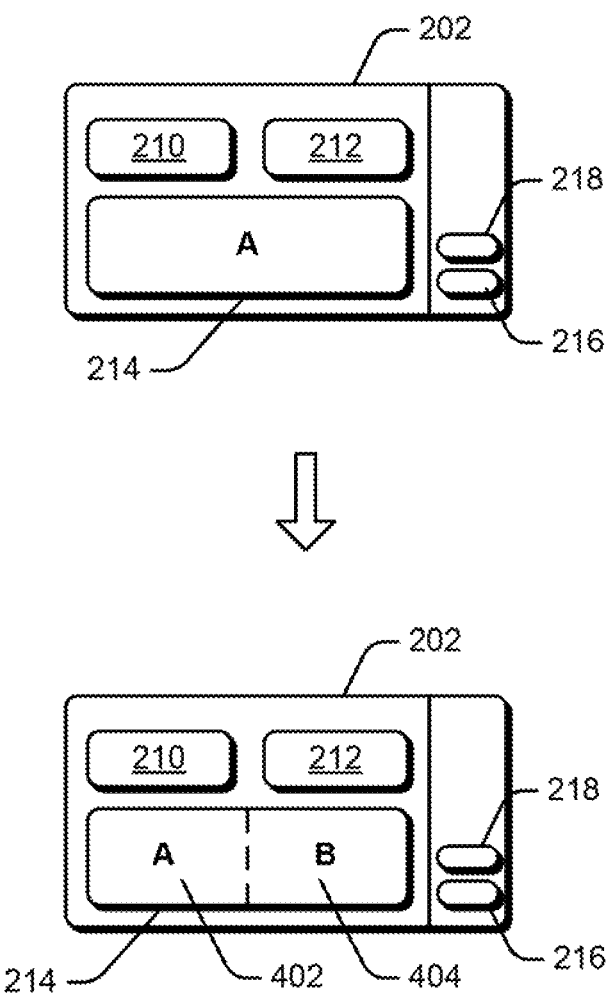
FIG. 4 illustrates the display system of FIG. 2 to display data from two computing systems, according to an example.

Referring back to FIG. 2, in response to determining that the first computing system 204 is in the active state and determining that the second computing system 206 is in the active state, the processor 210 provides a prompt to receive a user input, where the user input is indicative of display of the data received from the first computing system 204 and from the second computing system 206 on the display panel 214. In response to receiving the user input, the processor 210 causes the display panel 214 to shrink the display of the data received from the first computing system 204 to a first portion of the display panel 214 and to display the data received from the second computing system 206 on a second portion of the display panel 214. FIG. 4 illustrates the display system 202 of FIG. 2 to display data from two computing systems, according to an example. As shown in FIG. 4, in response to receiving the user input, the display of the data A received from the first computing system 204 is shrunk to a first portion 402 of the display panel 214 and the data B received from the second computing system 206 is displayed on a second portion 404 of the display panel 214. Although in FIG. 4, the first portion 402 is shown to be on the left side and the second portion 404 is shown to be on the right side of the display panel 214 leading to a vertical splitting of the display on the display panel 214, the reverse configuration or a horizontal splitting of the display on the display panel 214 are also possible.

Referring back to FIG. 2, processor 210 of the display system 202 may receive the user input through the toggle-switch 218. A user may actuate the toggle-switch 218 to provide the user input. In an example, the processor 210 may provide a pop-up display on the display panel 214, where the pop-up display may indicate additional display of the data received from the second computing system 206 on the display panel 214. The user may actuate the toggle-switch 218 to provide the user input upon seeing the pop-up display on the display panel 214.

In an example, the display panel 214 may be a display panel that can receive a gesture-based user input, such as a touch-based user input. With such a display panel, the processor 210 may provide a gesture-based user interface to receive the user input. The gesture-based user interface is displayed on the display panel 214. The gesture-based user interface may indicate additional display of the data received from the second computing system 206 on the display panel 214. The user may provide a gesture-based user input on the gesture-based user interface for the purpose of display the data received from the first computing system 204 and the second computing system 206.

Figure 5:
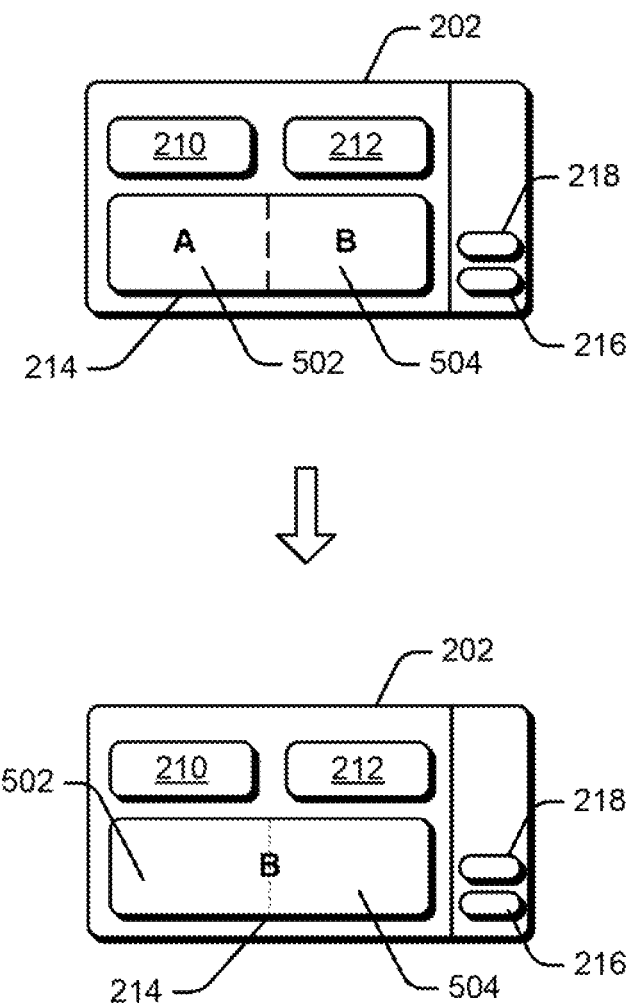
FIG. 5 illustrates the display system of FIG. 2 to switch display of data from two computing systems to one computing system, according to an example.

Further, while the data received from the first computing system 204 and the second computing system 206 are displayed on the first portion and the second portion, respectively, of the display panel 214, the processor 210 may determine based on the first message and the second message that the first computing system 204 is in an idle state and the second computing system 206 is in an active state. In response to determining that the first computing system 204 is in the idle state and determining that the second computing system 206 is in the active state, the processor 210 provides a prompt to receive a user input, where the user input being indicative of one of: (1) continue to display the data received from the first computing system 204 on the first portion of the display panel 214; (2) stop display of the data received from the first computing system 204 on the first portion of the display panel 214 and continue to display the data received from the second computing system 206 on the second portion of the display panel 214; and (3) stop display of the data received from the first computing system 204 and extend display of the data received from the second computing system 206 on the first portion and the second portion of the display panel 214. The processor 210 of the display system 202 may receive the user input through the toggle-switch 218 or through a gesture-based user interface in a same manner as described earlier in the description. FIG. 5 illustrates the display system of FIG. 2 to switch display of data from two computing systems to one computing system, according to an example. As shown in FIG. 5, in response to receiving the user input which is indicative of stopping of display of the data received from the first computing system 204 and extending of display of the data received from the second computing system 206 on the first portion 502 and the second portion 504 of the display panel 214, the display of the data A received from the first computing system 204 is stopped and display of the data B received from the second computing system 206 is extended to the first portion 502 and the second portion 504 of the display panel 214.

Figure 6:
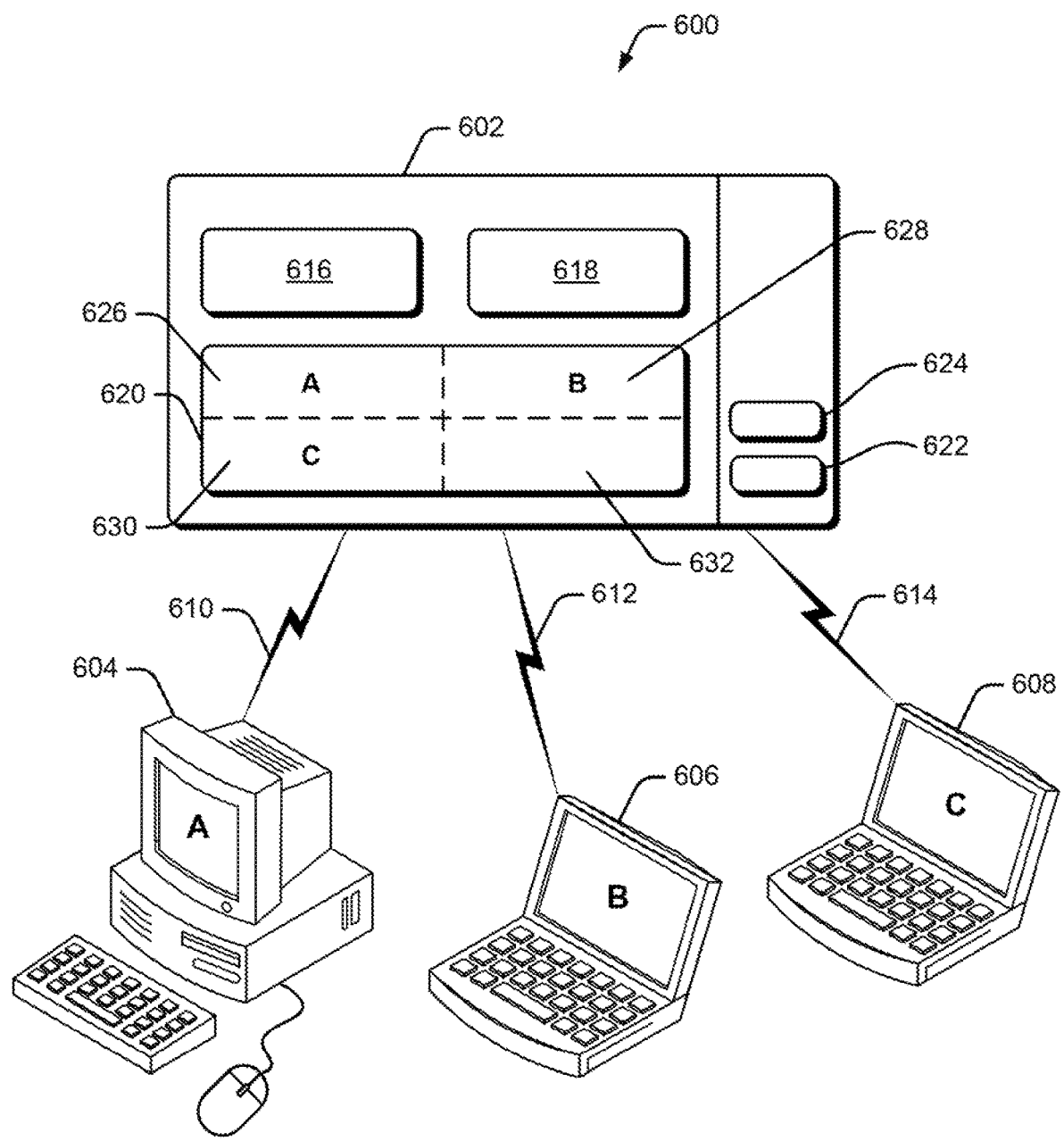
FIG. 6 illustrates a system environment with three computing systems and one display system, according to an example.

FIG. 6 illustrates a system environment 600 with three computing systems and one display system, according to an example. The system environment 600 includes a display system 602, a first computing system 604, a second computing system 606, and a third computing system 608. The display system 602 may be similar to the display system 202. The first computing system 604, the second computing system 606, and the third computing system 608 may be a desktop computer, a laptop computer, a tablet computer, a server, or a similar computing machine, used by a user (not shown).

The first computing system 604, the second computing system 606, and the third computing system 608 are communicatively connected to the display system 602 over a first communication link 610, a second communication link 612, and a third communication link 614, respectively. The first communication link 610, the second communication link 612, and the third communication link 614 may be a wired communication link or a wireless communication link, or a combination thereof.

The display system 602 includes a processor 616, a memory 618, and a display panel 620. The processor 616, the memory 618, and the display panel 620 may be similar to the processor 210, the memory 212, and the display panel 214, respectively, as described with reference to FIG. 2. Further, as shown in FIG. 6, the display system 602 includes a power-switch 622 and a toggle-switch 624, similar to the power-switch 216 and the toggle-switch 218, respectively, as described with reference to FIG. 2.

Upon establishing the first communication link 610, the second communication link 612, and the third communication link 614, the processor 616 may determine whether the first computing system 604, the second computing system 606, and the third computing system 608 respectively are in an active state or an idle state in a same manner as described with reference to FIG. 2. In response to determining that each of the first computing system 604, the second computing system 606, and the third computing system 608 is in the active state, the processor 616 causes the display panel 620 to display data received from the first computing system 604 on a first portion 626 of the display panel 620, display data received from the second computing system 606 on a second portion 628 of the display panel 620, and display data received from the third computing system 608 on a third portion 630 of the display panel 620. A fourth portion 632 of the display panel 620 may remain blank with no display.

The processor 616 causes the display panel 620 to display data depending on the combination of the determined states, from the active and idle states, of the first computing system 604, the second computing system 606, and the third computing system 608. The display of data depending on the combination of the determined states, from the active and idle states, of the first computing system 604, the second computing system 606, and the third computing system 608 is controlled and managed in the same manner as described with reference to FIGS. 3, 4, and 5.

Figure 7:
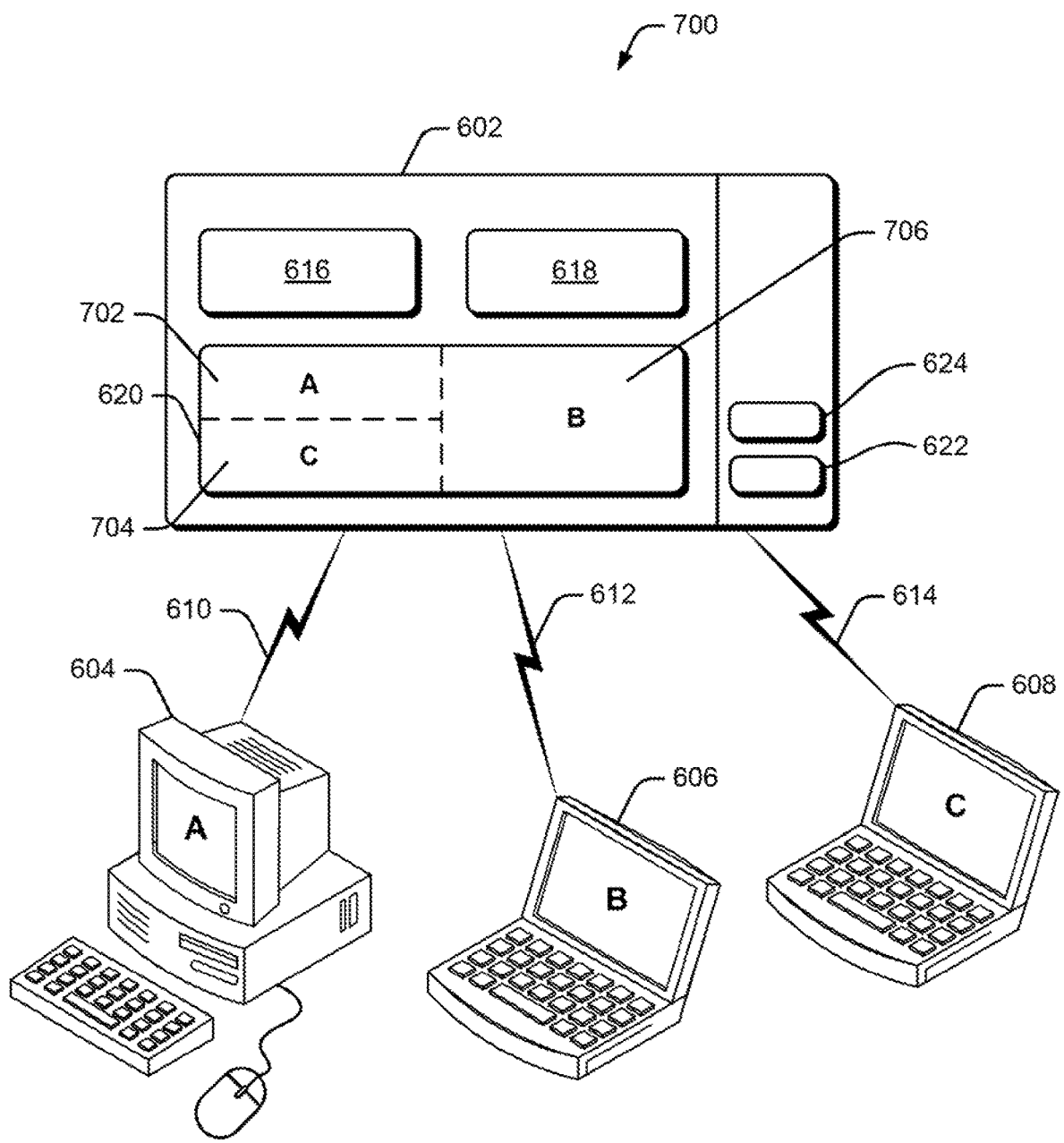
FIG. 7 illustrates a system environment with three computing systems and one display system, according to an example.

FIG. 6 shows an example arrangement of the first portion 626, the second portion 628, the third portion 630, and the fourth portion 632 of the display panel 620. Other arrangements of portions displaying the data from the first computing system 604, the second computing system 606, and the third computing system 608 are possible. FIG. 7 illustrates a system environment 700 with three computing systems and one display system, according to an example. In response to determining that the first computing system 604, the second computing system 606, and the third computing system 608 respectively are in the active state, the data received from the first computing system 604 is displayed in a first portion 702 of the display panel 620, the data received from the second computing system 606 is displayed in a second portion 704 of the display panel 620, and the data received from the third computing system 608 is displayed in a third portion 706 of the display panel 620. The portions displaying the data from the first computing system 604, the second computing system 606, and the third computing system 608, while all the three computing systems are determined to be in the active state, are non-overlapping portions of the display panel 620.

Figure 8:
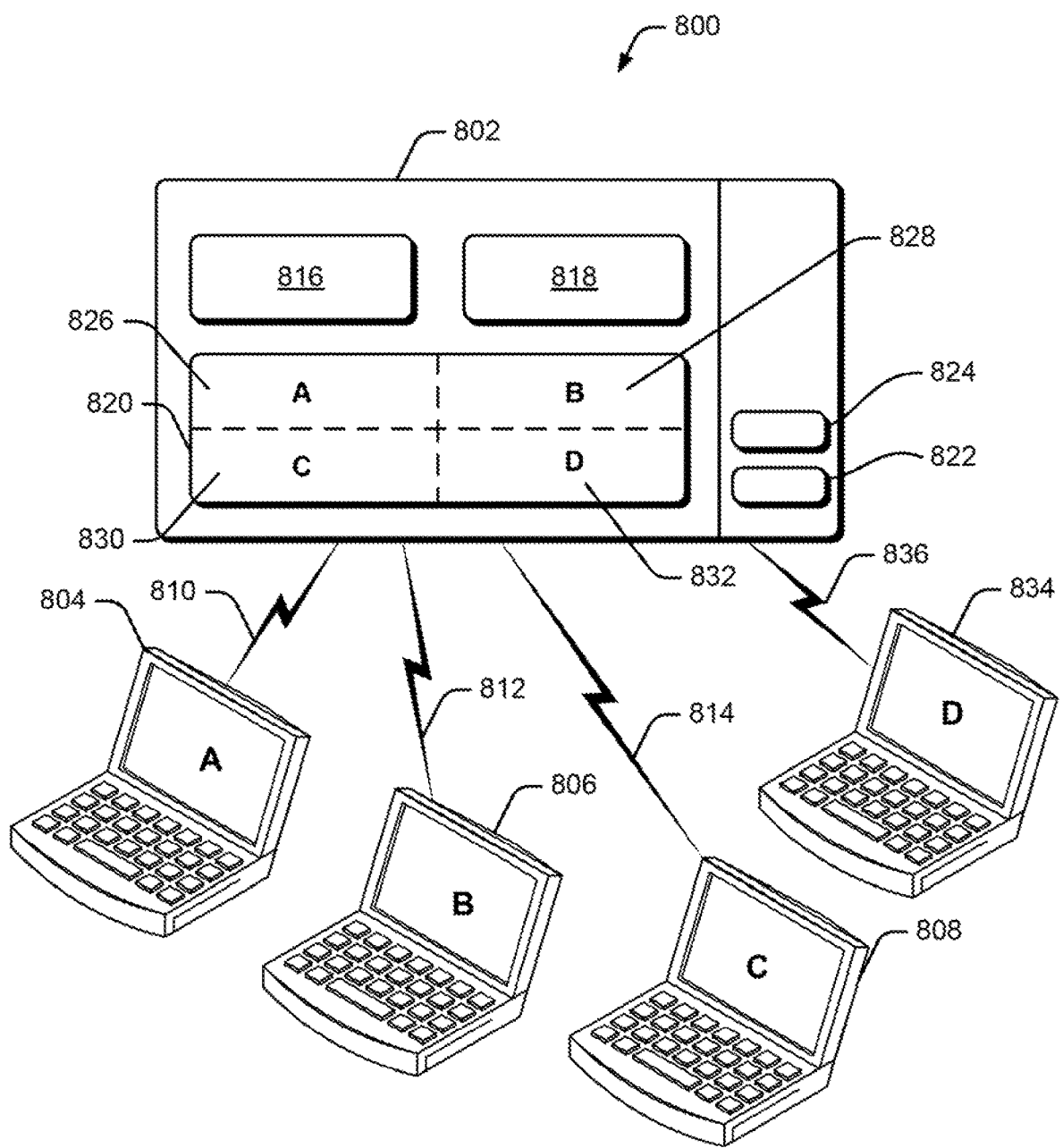
FIG. 8 illustrates a system environment with four computing systems and one display system, according to an example.

FIG. 8 illustrates a system environment 800 with four computing systems and one display system, according to an example. The system environment 800 includes a display system 802, a first computing system 804, a second computing system 806, a third computing system 808, and a fourth computing system 834. The display system 802 may be similar to the display system 802. The first computing system 804, the second computing system 806, the third computing system 808, and the fourth computing system 834 may be a desktop computer, a laptop computer, a tablet computer, a server, or a similar computing machine, used by a user (not shown).

The first computing system 804, the second computing system 806, the third computing system 808, and the fourth computing system 834 are communicatively connected to the display system 802 over a first communication link 810, a second communication link 812, a third communication link 814, and a fourth communication link 836, respectively. The first communication link 810, the second communication link 812, the third communication link 614, and the fourth communication link 836 may be a wired communication link or a wireless communication link, or a combination thereof.

The display system 802 includes a processor 816, a memory 818, and a display panel 820. The processor 816, the memory 818, and the display panel 820 may be similar to the processor 210, the memory 212, and the display panel 214, respectively, as described with reference to FIG. 2. Further, as shown in FIG. 8, the display system 802 includes a power-switch 822 and a toggle-switch 824, similar to the power-switch 216 and the toggle-switch 218, respectively, as described with reference to FIG. 2.

Upon establishing the first communication link 810, the second communication link 812, the third communication link 814, and the fourth communication link 836, the processor 816 may determine whether the first computing system 804, the second computing system 806, the third computing system 808, and the fourth computing system 834 respectively are in an active state or an idle state in a same manner as described with reference to FIG. 2. In response to determining that each of the first computing system 804, the second computing system 806, the third computing system 808, and the fourth computing system 834 is in the active state, the processor 816 causes the display panel 820 to display data received from the first computing system 804 on a first portion 826 of the display panel 820, display data received from the second computing system 806 on a second portion 828 of the display panel 820, display data received from the third computing system 808 on a third portion 830 of the display panel 620, and display data received from the fourth computing system 834 on a fourth portion 832 of the display panel 820.

The processor 816 causes the display panel 820 to display data depending on the combination of the determined states, from the active and idle states, of the first computing system 804, the second computing system 806, the third computing system 808, and the fourth computing system 834. The display of data depending on the combination of the determined states, from the active and idle states, of the first computing system 804, the second computing system 806, the third computing system 808, and the fourth computing system 834 is controlled and managed in the same manner as described with reference to FIGS. 3, 4, and 5.

FIG. 8 shows an example arrangement of the first portion 826, the second portion 828, the third portion 830, and the fourth portion 632 of the display panel 820. Other arrangements of portions displaying the data from the first computing system 804, the second computing system 606, the third computing system 808, and the fourth computing system 834 are possible. The portions displaying the data from the first computing system 804, the second computing system 806, the third computing system 808, and the fourth computing system 834, while all the four computing systems are determined to be in the active state, are non-overlapping portions of the display panel 820.

Figure 9:
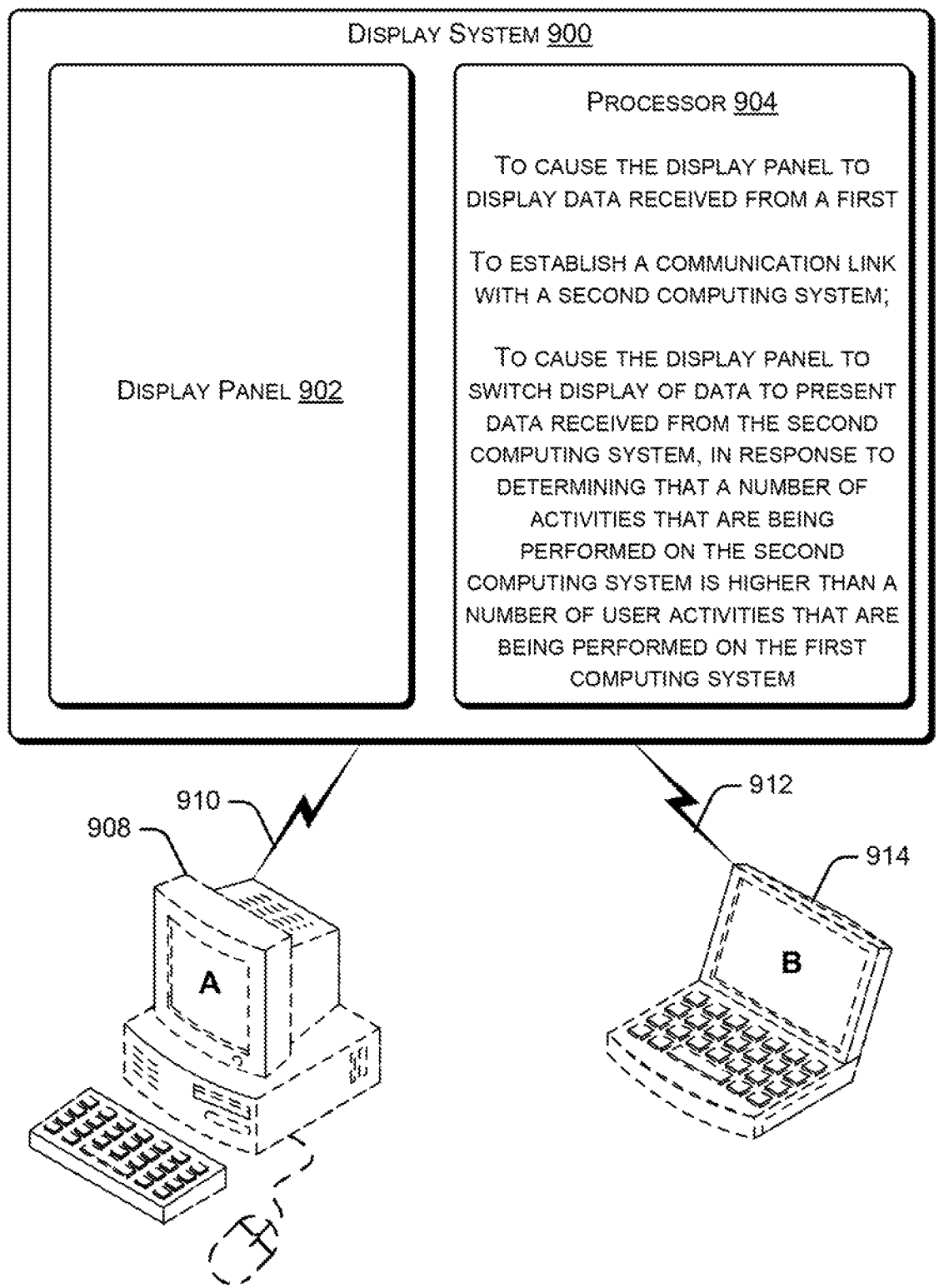
FIG. 9 illustrates a display system, according to an example.

FIG. 9 illustrates a display system 900, according to an example. The display system 900 may be an output device or an electronic display, for example, a display monitor and a television, similar to the display system 100 or 202. As shown, the display system 900 includes a display panel 902. In an example, the display panel 902 is an LCD-based display panel or an LED-based display panel.

Further, the display system 900 may include a memory (not shown in FIG. 9). The memory may include a non-transitory computer-readable medium including, for example, a volatile memory, such as a static random access memory (SRAM) and a dynamic random access memory (DRAM), or a non-volatile memory, such as a read-only memory (ROM), an erasable programmable ROM, a flash memory, a hard disk, an optical disk, a memristor, and a magnetic tape.

Further, the display system 900 includes a processor 904. The processor 904 is coupled to the display panel 902. In some examples, the disclosure described herein is implemented by executing instructions stored in a memory by the processor 904. The processor 904 may be implemented as a microprocessor, a microcomputer, a microcontroller, a digital signal processor, a central processing unit, state machines, a logic circuitry, or any device that manipulates signals based on operational instructions. Among other capabilities, the processor 904 may fetch and execute computer-readable instructions stored in a non-transitory computer-readable storage medium, such as a memory. Further, the processor 904 may be provided through the use of dedicated hardware as well as hardware capable of executing computer-readable instructions.

In an example, the processor 904 causes the display panel 902 to display data received from a first computing system 908. The first computing system 908 may be a desktop computer, a laptop computer, a tablet computer, a server, or a similar computing machine communicatively connected with the display system 900. The first computing system 908 may be communicatively connected with the display system 900 over a communication link 910. The communication link 910 may be a wired or a wireless communication link. The communication link 910 may interchangeably be referred hereinafter as a first communication link 910.

While the display panel 902 displays the data received from the first computing system 908, the processor 904 may establish a communication link 912, interchangeably referred hereinafter as a second communication link 912, with a second computing system 914. The second computing system 914 may be a desktop computer, a laptop computer, a tablet computer, a server, or a similar computing machine communicatively connected with the display system 900. The second communication link 912 may be a wired communication link or a wireless communication link.

After establishing the communication link 912 with the second computing system 914, the processor 904 may determine a number of activities that are being performed on the first computing system 908 and a number of activities that are being performed on the second computing system 914. An activity may include a user activity, a host activity, or a combination thereof. The user activity may be an activity performed by a user and may include, but is not limited to, pressing a keyboard key of the computing system, operating a mouse connected to the computing system, and being present in front of a computing system to be detected for the presence in front of the computing system using a proximity sensor. The proximity sensor may include an image capturing device, such as a camera. The host activity may be a background activity associated with an application or computer-readable instructions which is being executed or performed at the background in the computing system. The host activity may include, but is not restricted to, a system operation, uploading or downloading a file or an application, installation of an application or computer-readable instructions, operation of an application, and execution of computer-readable instructions. Further, in an example, a computing system is said to be in an active state when a user activity, a host activity, or a combination thereof is performed on the computing system in a predetermined time period, for example, last 30 seconds.

Further, in response to determining that the number of activities that are being performed on the second computing system 914 is higher than the number of activities that are being performed on the first computing system 908, the processor 904 causes the display panel 902 to switch display of data to present data received from the second computing system 914. Thus, the display system 900 stops displaying the data received from the previously connected first computing system 908 and automatically switches the display to present the data received from the newly connected second computing system 914.

In an example, the processor 904 may track and store the number of activities that are being performed on the first computing system 908 as a first set of activities. Similarly, the processor 904 may track and store the number of activities that are being performed on the second computing system 914 as a second set of activities. In an example, the processor 904 may store the first set of activities and the second set of activities in a memory. The memory may be an internal memory of the display system 900 or an external memory coupled to the display system 900. In an example, for the purpose of tracking the number of activities being performed on a computing system, the display system 900 may receive a message from the computing system, where the message is indicative of the number of activities that are being performed on the computing system. Such a message may be received periodically, for example, at an interval of 1 second. The processor 904 may decode the message to determine the number of activities being performed on the computing system.

Further, the processor 904 may compare respective display priorities associated with the first set of activities and the second set of activities to determine whether the second computing system 914 has the higher number of activities than the number of activities on the first computing system 908. Table 1 enlists example display priorities for various example sets of activities. Display priorities and sets of activities can be other than the examples enlisted in Table 1. The information associated with the set of activities and the display priority, as shown in Table 1, may be stored in a memory. The memory may be an internal memory of the display system 900 or an external memory coupled to the display system 900. The processor 904 may access the memory for the purpose of comparison as described herein.

TABLE 1

| Set of Activities | Display Priority | Priority Order |
|---|---|---|
| Operation of mouse + Pressing of a keyboard key + User presence in front of computing system | #1 | Highest |
| Operation of mouse + User presence in front of computing system | #2 | . |
| Pressing of a keyboard key + User presence in front of computing system | #3 | . |
| Operation of mouse + Pressing of a keyboard key | #4 | . |
| Operation of mouse | #5 | . |
| Pressing of a keyboard key | #6 | . |
| User presence in front of computing system + Uploading/Downloading a file or an application | #7 | . |
| User presence in front of computing system + Installing an application | #8 | . |

TABLE 1-continued

| Set of Activities | Display Priority | Priority Order |
|---|---|---|
| User presence in front of computing system + Executing an application | #9 | . |
| Uploading/Downloading a file or an application | #10 | . |
| Installing an application | #11 | . |
| Executing an application | #12 | Lowest |

The processor 904 causes the display panel 902 to display the data received from the first computing system 908 or the second computing system 914 or both, depending on the display priority associated with the set of activities that are being performed on the first computing system 908 and the second computing system 914. For example, in response to determining that the second computing system 914 has the number of activities higher than the number of activities on the first computing system 908, i.e., the display priority associated with the second set of activities is higher than the display priority associated with the first set of activities, the processor 904 causes the display panel 902 to switch display of data to present data received from the second computing system 914. Further, for example, in response to determining that the second computing system 914 has the number of activities equal to the number of activities on the first computing system 908, i.e., the display priorities associated with the first set of activities and the second set of activities are same, the processor 904 provides a prompt to receive a user input, where the user input is indicative of display of the data received from the first computing system 908 and from the second computing system 914 on the display panel 902. In response to receiving the user input, the processor 904 causes the display panel 902 to shrink the display of the data received from the first computing system 908 to a first portion of the display panel 902 and to display the data received from the second computing system 914 on a second portion of the display panel 902. The first portion and the second portion are non-overlapping portions of the display panel 902. Further, for example, in response to determining that the second computing system 914 has the number of activities lower than the number of activities on the first computing system 908, i.e., the display priority associated with the second set of activities is lower than the display priority associated with the first set of activities, the processor 904 continues to display the data received from the first computing system 908.

In an example, the display system 900 may include a toggle-switch (not shown in FIG. 9) coupled to the processor 904. The toggle-switch is actuatable to receive the user input, as described with respect to FIG. 2. In an example, the processor 904 may provide a gesture-based user interface on the display panel 902, as described with respect to FIG. 2, to receive the user input.

Figure 10:
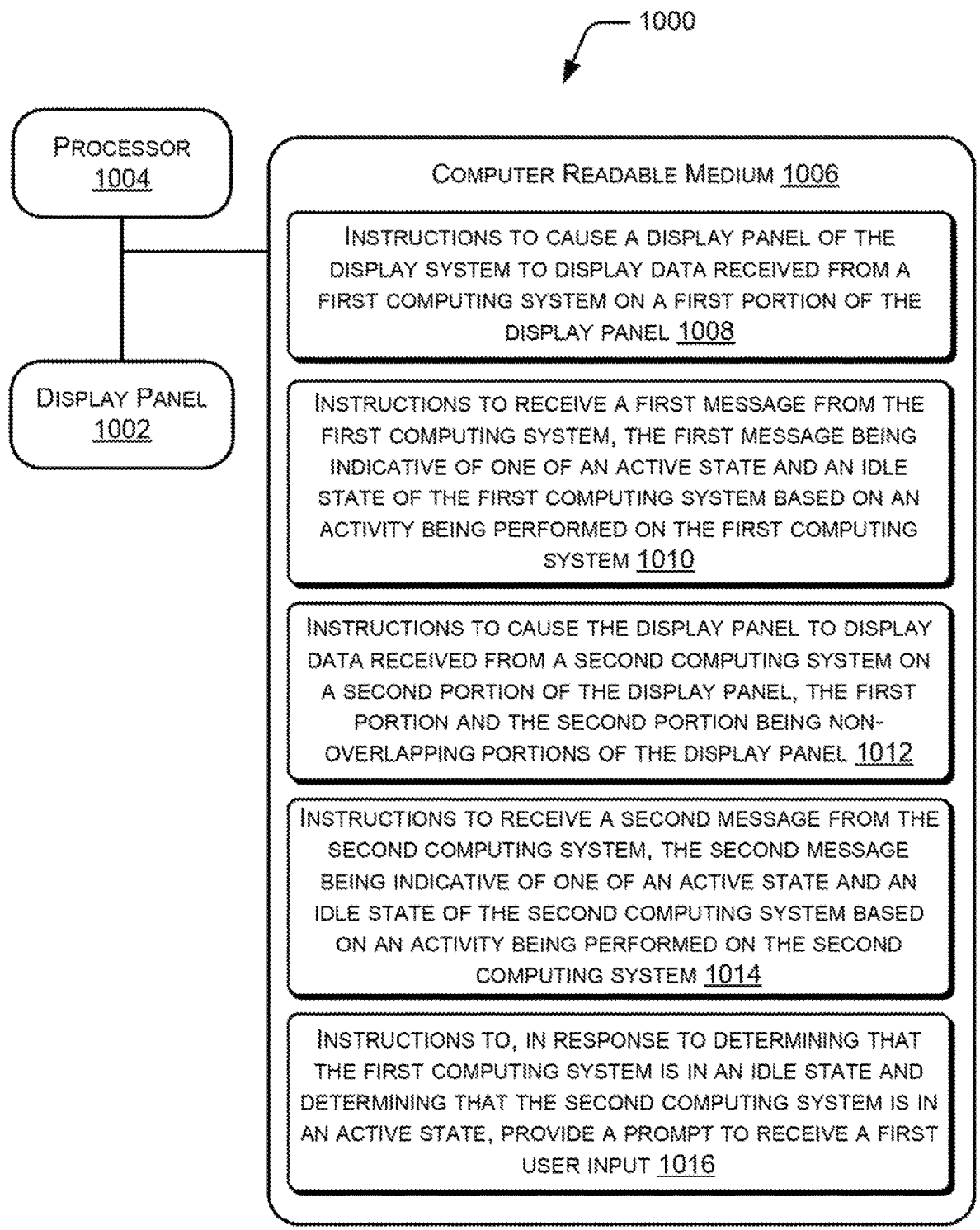
FIG. 10 illustrates a system environment implementing a non-transitory computer-readable medium for displays on a display system, according to an example.

FIG. 10 illustrates a system environment 1000 implementing a non-transitory computer-readable medium for displays on a display system 1002, according to an example. The system environment 1000 includes a processor 1004 communicatively coupled to the non-transitory computer-readable medium 1006. In an example, the processor 1004 may be a processing resource of a display system for fetching and executing computer-readable instructions from the non-transitory computer-readable medium 1006. The display system may be the display system 100, 202, or 900 as described with reference to FIGS. 1, 2, and 9.

The non-transitory computer-readable medium 1006 can be, for example, an internal memory device or an external memory device. In an example, the processor 1004 may be communicatively coupled to the non-transitory computer-readable medium 1006 through a communication link. The communication link may be a direct communication link, such as any memory read/write interface. In another example, the communication link may be an indirect communication link, such as a network interface. In such a case, the processor 1004 can access the non-transitory computer-readable medium 1006 through a communication network.

Referring to FIG. 10, in an example, the non-transitory computer-readable medium 1006 includes instructions 1008 to cause a display panel of the display system 1002 to display data received from a first computing system on a first portion of the display panel. The first computing system is communicatively connected to the processor 1004. The non-transitory computer-readable medium 1006 includes instructions 1010 to receive a first message from the first computing system, where the first message is indicative of one of an active state and an idle state of the first computing system based on an activity being performed on the first computing system. The active state, the idle state, and the activity are the same as described with reference to FIGS. 1 and 2.

The non-transitory computer-readable medium 1006 includes instructions 1012 to cause the display panel to display data received from a second computing system on a second portion of the display panel. The first portion and the second portion are non-overlapping portions of the display panel. The second computing system is communicatively connected to the processor 1004. The non-transitory computer-readable medium 1008 further includes instructions 1014 to receive a second message from the second computing system, where the second message is indicative of one of an active state and an idle state of the second computing system based on an activity being performed on the second computing system. The active state, the idle state, and the activity are the same as described with reference to FIGS. 1 and 2.

The non-transitory computer-readable medium 1006 further includes instructions 1016 to provide a prompt to receive a first user input, in response to determining that the first computing system is in an idle state and determining that the second computing system is in an active state. The first user input is indicative of one of: (1) continue to display the data received from the first computing system on the first portion; (2) stop display of the data received from the first computing system on the first portion and continue to display the data received from the second computing system on the second portion; and (3) stop display of the data received from the first computing system and extend display of the data received from the second computing system on the first portion and the second portion. The processor 1004 causes the display panel of the display system 1002 to display data in accordance with the first user input.

In an example, the non-transitory computer-readable medium 1006 further includes instructions to establish a communication link with a third computing system, and include instructions to cause the display panel to switch display of data to present data received from the third computing system, in response to determining that the first computing system is in an idle state, determining that the second computing system is in an idle state, and determining that the third computing system is in an active state.

In an example, the non-transitory computer-readable medium 1006 further includes instructions to provide a prompt to receive a second user input, in response to determining that the first computing system is in the idle state, determining that the second computing system is in the active state, and determining that the third computing system is in the active state. The second user input is indicative of one of: (1) continue to display the data received from the first computing system on the first portion, display the data received from the second computing system on the second portion, and display the data received from the third computing system on a third portion of the display panel; (2) stop display of the data received from the first computing system on the first portion, continue to display the data received from the second computing system on the second portion, and display the data received from the third computing system on the third portion of the display panel; and (3) stop display of the data received from the first computing system, continue to display the data received from the second computing system on the second portion, and display the data received from the third computing system on the first portion. The processor 1004 causes the display panel of the display system 1002 to display data in accordance with the second user input.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A non-transitory computer-readable medium comprising computer-readable instructions, which, when executed by a processor of a display system, cause the processor to:
    cause a display panel of the display system to display data received from a first computing system on a first portion of the display panel;
    receive a first message from the first computing system, the first message being indicative of one of an active state and an idle state of the first computing system based on an activity being performed on the first computing system;
    cause the display panel to display data received from a second computing system on a second portion of the display panel, the first portion and the second portion being non-overlapping portions of the display panel;
    receive a second message from the second computing system, the second message being indicative of one of an active state and an idle state of the second computing system based on an activity being performed on the second computing system; and
    in response to determining that the first computing system is in an idle state and determining that the second computing system is in an active state, provide a prompt to receive a first user input, the first user input being indicative of one of:
        continue to display the data received from the first computing system on the first portion;
        stop display of the data received from the first computing system on the first portion and continue to display the data received from the second computing system on the second portion; and
        stop display of the data received from the first computing system and extend display of the data received from the second computing system on the first portion and the second portion.

2. The non-transitory computer-readable medium as claimed in claim 1, further comprising computer-readable instructions, which, when executed by the processor, cause the processor to:

establish a communication link with a third computing system; and cause the display panel to switch display of data to present data received from the third computing system, in response to determining that the first computing system is in an idle state, determining that the second computing system is in an idle state, and determining that the third computing system is in an active state.

3. The non-transitory computer-readable medium as claimed in claim 2, further comprising computer-readable instructions, which, when executed by the processor, cause the processor to:

in response to determining that the first computing system is in the idle state, determining that the second computing system is in the active state, and determining that the third computing system is in the active state, provide a prompt to receive a second user input, the second user input being indicative of one of:

continue to display the data received from the first computing system on the first portion, display the data received from the second computing system on the second portion, and display the data received from the third computing system on a third portion of the display panel;

stop display of the data received from the first computing system on the first portion, continue to display the data received from the second computing system on the second portion, and display the data received from the third computing system on the third portion of the display panel; and stop display of the data received from the first computing system, continue to display the data received from the second computing system on the second portion, and display the data received from the third computing system on the first portion.

4. A display system comprising:
a display panel; and
a processor, coupled to the display panel, to:
cause the display panel to display data received from a first computing system;
establish a communication link with a second computing system; and
cause the display panel to switch display of data to present data received from the second computing system, in response to determining that a number and type of activities that are being performed on the second computing system has a higher priority than a number and type of activities that are being performed on the first computing system.

5. The display system as claimed in claim 4, wherein the processor is to:
track and store the number of activities that are being performed on the first computing system as a first set of activities;
track and store the number of activities that are being performed on the second computing system as a second set of activities;
compare respective display priorities associated with the first set of activities and the second set of activities to determine whether the second computing system has the higher number of activities than the number of activities on the first computing system.

6. The display system as claimed in claim 4, wherein the processor is to:
in response to determining that the second computing system has the number of activities equal to the number of activities on the first computing system, provide a prompt, comprising a pop-up display, to receive a user input, the user input being indicative of displaying of the data received from the first computing system and from the second computing system on the display panel; and in response to receiving the user input, cause the display panel to shrink the display of the data received from the first computing system to a first portion of the display panel and to display the data received from the second computing system on a second portion of the display panel, wherein the first portion and the second portion are non-overlapping portions of the display panel.

7. The display system as claimed in claim 6, further comprising:
a toggle-switch coupled to the processor, the toggle-switch being actuatable to receive the user input.

8. The display system as claimed in claim 4, wherein different sets of activities are assigned different relative priorities, each set having a unique combination of number and type of activities.

9. A display system comprising:
a display panel; and
a processor, coupled to the display panel, to:
cause the display panel to display data received from a first computing system;
establish a communication link with a second computing system; and
cause the display panel to switch display of data to present data received from the second computing system, in response to determining that the first computing system is in an idle state and determining that the second computing system is in an active state.

10. The display system as claimed in claim 9, wherein the processor is to:
receive a first message from the first computing system, the first message being indicative of one of an active state and an idle state of the first computing system based on an activity being performed on the first computing system.

11. The display system as claimed in claim 9, wherein the processor is to:
receive a second message from the second computing system, the second message being indicative of one of an active state and an idle state of the second computing system based on an activity being performed on the second computing system.

12. The display system as claimed in claim 9, wherein the processor is to:
in response to determining that the first computing system is in an active idle state and determining that the second computing system is in the active state, provide a prompt to receive a user input, the user input being indicative of displaying of the data received from the first computing system and from the second computing system on the display panel.

13. The display system as claimed in claim 12, further comprising:
a toggle-switch coupled to the processor, the toggle-switch being actuatable to receive the user input that determines how data from the first and second computing systems is displayed on the display panel.

14. The display system as claimed in claim 12, wherein the processor is to:
provide a gesture-based user interface on a touch-sensitive display to receive the user input that determines how data from the first and second computing systems is displayed on the display panel.

15. The display system as claimed in claim 14, wherein the gesture-based user interface is provided on a touch-sensitive display.

16. The display system as claimed in claim 12, wherein the processor is to:
   in response to receiving the user input, cause the display panel to shrink the display of the data received from the first computing system to a first portion of the display panel and to display the data received from the second computing system on a second portion of the display panel.

17. The display system as claimed in claim 16, wherein the first portion and the second portion are non-overlapping portions of the display panel.

18. The display system as claimed in claim 9, wherein both the first and second computing systems are operated by, and under control of, a single user.

19. The display system as claimed in claim 9, wherein the processor is further to accept a user-specified time period over which to determine whether either computing system is idle or active.

20. The display system as claimed in claim 9, wherein the processor is further to monitor both user and host activity at each computing system to determine whether either computing system is idle or active.

* * * * *